United States Patent [19]
Yang

[11] Patent Number: 5,479,577
[45] Date of Patent: Dec. 26, 1995

[54] NEURAL DEVICE

[75] Inventor: Weikang Yang, Tokyo, Japan

[73] Assignee: Ezel Inc., Tokyo, Japan

[21] Appl. No.: 275,655

[22] Filed: Jul. 15, 1994

Related U.S. Application Data

[63] Continuation of Ser. No. 15,789, Feb. 10, 1993, abandoned.

[30] Foreign Application Priority Data

Mar. 6, 1992 [JP] Japan ..................................... 4-084544

[51] Int. Cl.$^6$ ..................................................... G06F 15/80
[52] U.S. Cl. ............................................................. 395/24
[58] Field of Search .......................................... 395/24, 27

[56] References Cited

U.S. PATENT DOCUMENTS

| | | | |
|---|---|---|---|
| 3,649,873 | 3/1972 | Vlack ...................................... | 361/104 |
| 4,719,591 | 1/1988 | Hopfield et al. ......................... | 364/807 |
| 4,731,747 | 3/1988 | Denker ...................................... | 395/24 |
| 4,811,298 | 3/1989 | Helwig et al. ........................... | 365/200 |
| 4,873,661 | 10/1989 | Tsividis ..................................... | 395/24 |
| 4,903,226 | 2/1990 | Tsividis ..................................... | 364/807 |
| 4,988,891 | 1/1991 | Mashiko ................................... | 307/201 |
| 5,053,638 | 10/1991 | Furutani et al. .......................... | 395/24 |
| 5,061,866 | 10/1991 | El-Naggar et al. ....................... | 395/24 |
| 5,142,666 | 8/1992 | Yoshizawa et al. ....................... | 395/24 |
| 5,165,010 | 11/1992 | Masuda et al. ........................... | 395/27 |
| 5,179,631 | 1/1993 | Guddanti et al. ......................... | 395/27 |
| 5,216,746 | 6/1993 | Yoshizawa et al. ....................... | 395/24 |

FOREIGN PATENT DOCUMENTS

| | | |
|---|---|---|
| 5251789 | 9/1993 | Japan . |
| WO8801079 | 2/1988 | WIPO . |

OTHER PUBLICATIONS

Distante et al, "Fault Tolerant Characteristics of the Linear Array Architecture for WSI Implementation of Neural Nets", 1991 Proc. Int'l Conf on Wafer Scale Integration, Jan. 29–31, 1991, pp. 113–119.

Tam et al "A Reconfigurable Multi–Chip Analog Neural Network; Recognition and Back–Propagation Training", IJCNN Jun. 7–11, 1992, pp. 625–630, vol. 2.

Shimokawa et al, "A Parallel ASIC VLSI Neurocomputer For A Large Number of Neurons and Billion Connections Per Second", IJCNN Nov. 18–21, 1991, pp. 2162–2167, vol. 3.

Yasunaga et al, "Design, Fabrication and Evaluation of a 5" Wafer Scale Neural Network LCI Composed of 576 Digital Neurons", IJCNN Jun. 17–21, 1990, pp. 527–535, vol. 2.

A. Moopenn et al.: "A Neural Network for Euclidean Distance Minimization"; IEEE International Conference on Networks; vol. 2, 24 Jul. 1988, pp. 349–356.

Y. Wang et al.; "Design of Neural Network Systems From Custom Analog VLSI Chips"; 1990 IEEE International ymposium on Circuits and Systems; vol. 2, 1 May 1990, pp. 1098–1101.

*Primary Examiner*—Robert W. Downs
*Attorney, Agent, or Firm*—Cushman, Darby & Cushman

[57] ABSTRACT

A large scale integrated neural device has a number of processor elements, each with a number of input lines and a single output line. The neural device also has a local bus with a number of conductors. Each conductor receives one of the output lines from each processor. Any input line of any processor element may be connected to any bus conductor through a switch element. Each processor element generates, as an output, an integrated result of weighted input signals. The switch element ON/OFF state may be programmed from external signals.

3 Claims, 2 Drawing Sheets

NEURAL DEVICE

This is a continuation of application Ser. No. 08/015,789, filed on Feb. 10, 1993, which was abandoned upon the filing hereof.

FIELD OF THE INVENTION

This invention relates to a neural network device, especially to one comprising multiple processor elements which output weighted integrated results of a signal input from an input line which connects these processor elements through a local bus.

BACKGROUND OF THE INVENTION

When electronic hardware is used to realize a neural network, the amount of information communicated among processor elements increases, especially when a high degree of parallel processing is applied with the large number of processor elements. In this case, communication delays become large.

On the other hand; in order to accelerate communication while maintaining the degree of parallel processing, it is conceivable that multiple processor elements may be formed in a single LSI. However, that single LSI cannot comply a large portion of a network because the conditions are fixed between processor elements in LSI.

SUMMARY OF THE INVENTION

This invention solves the above mentioned conventional problems, and has an object to provide a neural device that is able to adapt to a composition of wide neural network while setting multiple processor elements in a LSI.

The neural device relating to this invention sets a local bus in a LSI: the local bus sets multiple conductors Lc arranged in parallel corresponding to the output line of each processor element, connects one of the output lines to each conductor, and connects all the input lines of each processor element to each conductor through the switch element.

According to the above description of this invention, it is possible to adapt to the wide neural network while setting a plural number of processor elements in a LSI.

PREFERRED EMBODIMENT OF THE PRESENT INVENTION

Hereinafter, an embodiment of a neural device according to this invention is explained with reference to the attached drawings.

Figure 1:
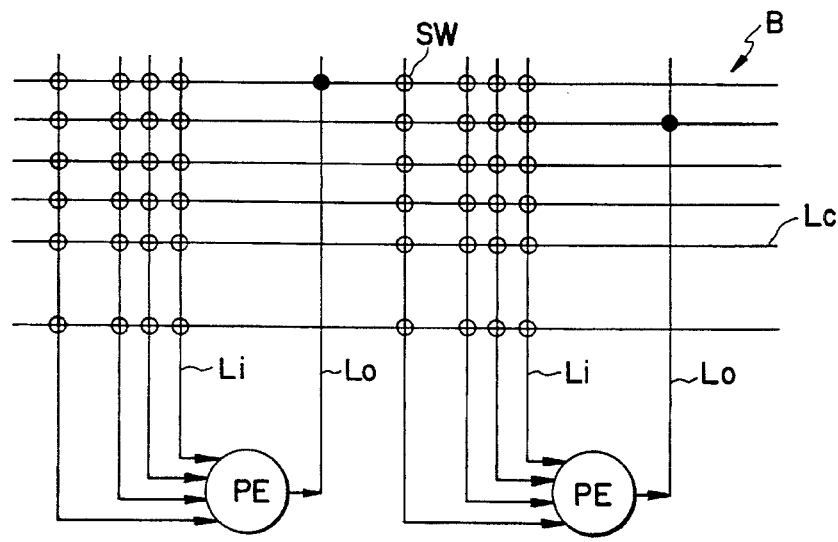
FIG. 1 is a block diagram showing an embodiment of neural device relating to this invention.

The neural device multiple processor elements PE are connected through local bus B, as shown in FIG. 1.

Processor element PE has a number of input lines Li and a single output line Lo. The processor element integrates input data from input lines Li to generate the output signal. This integration is accomplished by multiplying input data by weights and transforming the result according to a predetermined function. Sigmoid function S<> can be used, giving the processing element the following function:

$Y = S<\Sigma X_i W_i + \theta>$

Y: output

Xi: i-th input

Wi: i-th weight

θ: offset

Output line Lo of each processor element PE is connected with one of the conductors in local bus B. The output signal may be input through the conductor into the other processor elements, input lines of each processor element PE may be connected to any conductors Lc through switch elements SW according to an ON/OFF state of the switch elements.

Figure 2:
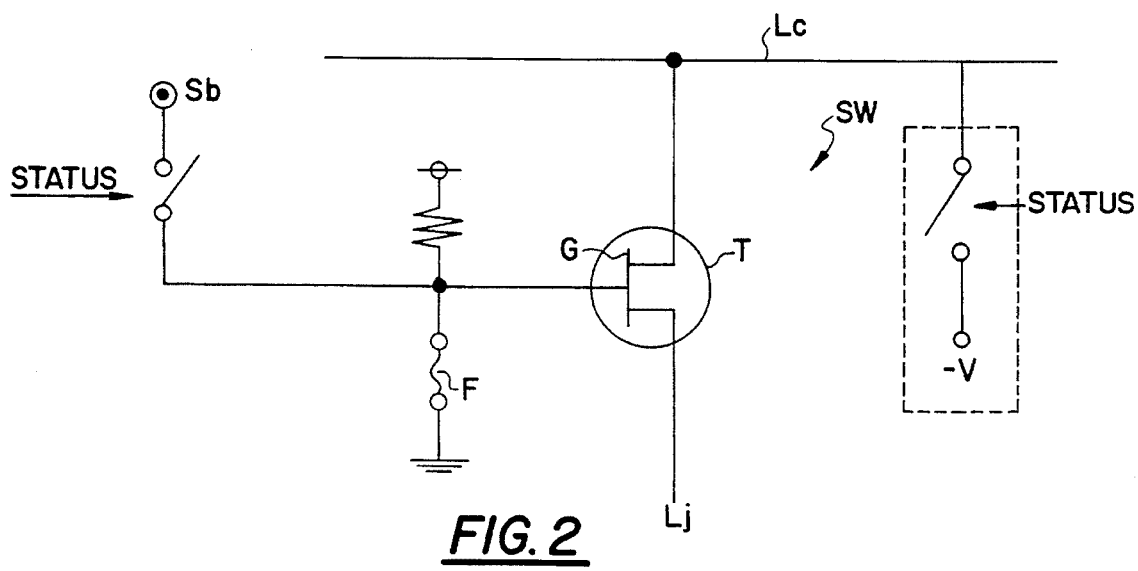
FIG. 2 is a block diagram showing details of switch element in the embodiment in FIG. 1.

FIG. 2 shows that a switch element SW has transistor T whose gate G is connected to a reference voltage and to a fuse F for grounding the gate. The switch element SW turns off while this fuse F connects the gate to ground. At the beginning, the LSI is fabricated with fuse F connecting the gate to ground. There are several methods for blowing a fuse. One of them connects a power source Sb with fuse F. Another impresses a negative voltage −V on conductor Lc, which in turn leads electric current from gate G of a transistor.

By controlling the switch element ON/OFF state, each processor element PE may be set as intended. The ON/OFF state is controlled by a status signal from a source external to the LSI. A status signal is once registered in an LSI and fuse F is fused according to the status signal after the status signal has been registered.

Figure 3:
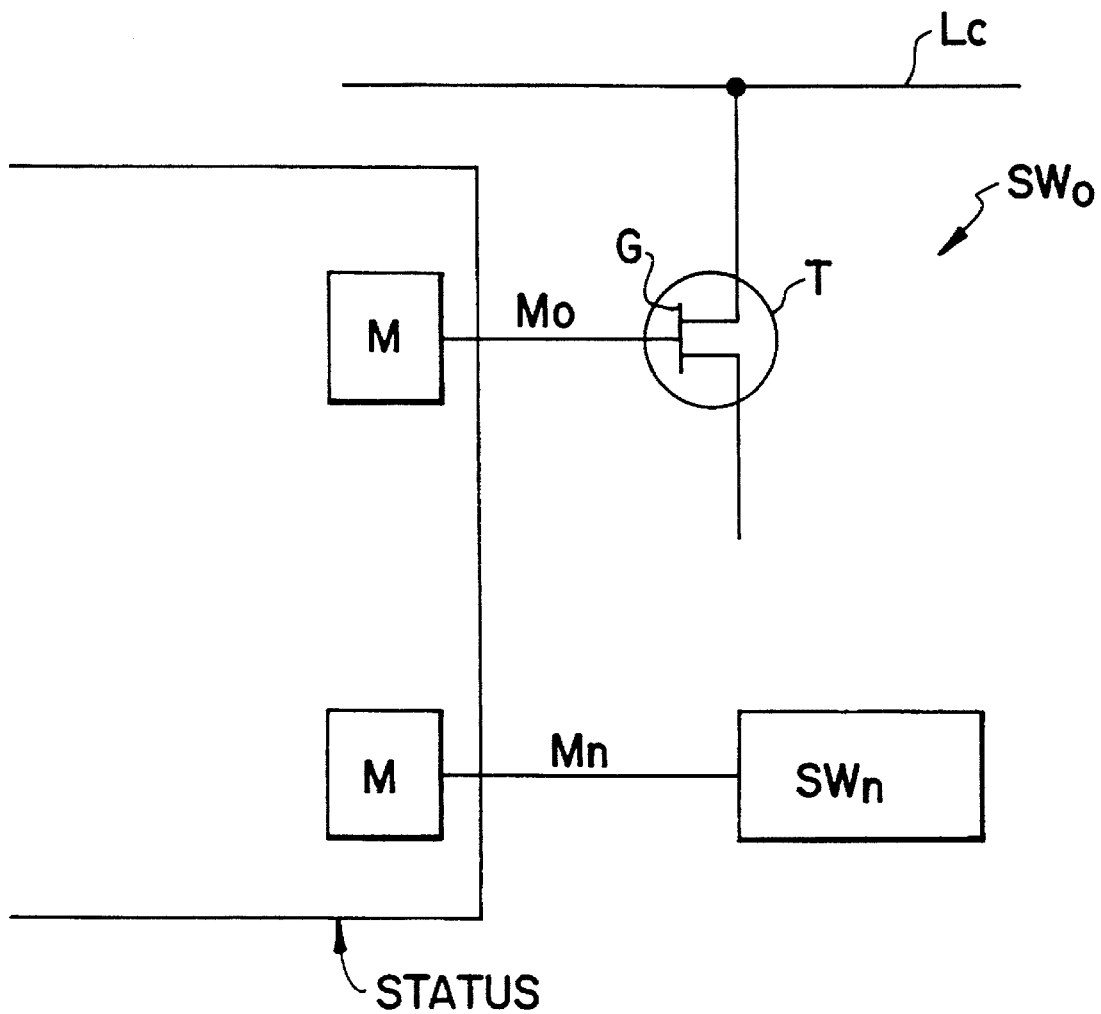
FIG. 3 is a block diagram showing another embodiment of switch element.

FIG. 3 shows another embodiment of switch element SW. Each switch element $SW_n$ connects the output Mo memory cell Mn to a gate G of a transistor T. Each switch element $SW_n$ is ON when the output Mo of memory cell Mn at a high level. A status signal is input to memory cell $M_n$ from outside of the LSI, and an output for each switch element is set according to this status signal. By storing a status signal in a memory cell, the connectedness of each processor element can be changed as desired.

A neural device relating to this invention has a local bus in a LSI. The local bus has a number of conductors Lc arranged in parallel. The output line of each processor element connects to one bus conductor. Any input lines of any processor element may be connected to any bus conductor through the switch elements. Therefore, the neural device may be adapted to a wide variety of neural structures, as well as incorporating a number of processor elements in a single LSI.

What is claimed is:

1. A neural device comprising:

a plurality of processor elements for processing input signals and generating an output signal responsive to said processing, each processor element including a plurality of input lines and an output line;

a local bus having a plurality of conductors, each conductor being connected to one of said processor element output lines; and a plurality of switch elements, each switch element selectively connecting a local bus conductor to one of said processor element input lines, said switch elements defining network connectivity; where each said switch element comprises a transistor having a gate for receiving a first voltage and a fuse for connecting said gate to a second voltage, where said transistor is set to an OFF state when an externally-generated status signal changes said fuse to an open state, and where said processor element generates an output based on integrated weighted signals which are input from said input lines, and said switch elements switch ON or OFF in accordance with said status signal, said network connectivity being reconfigured based on said switching of said switch elements.

2. A neural device as in claim 1 wherein said status signal changes the fuse to an open state by connecting a power source to said fuse.

3. A neural device as in claim 1 wherein said status signal changes the fuse to an open state by impressing a negative voltage on an emitter of the transistor through a local bus conductor.

* * * * *